(No Model.)
H. M. CLEMONS.
BRIDLE BIT.
No. 327,139. Patented Sept. 29, 1885.
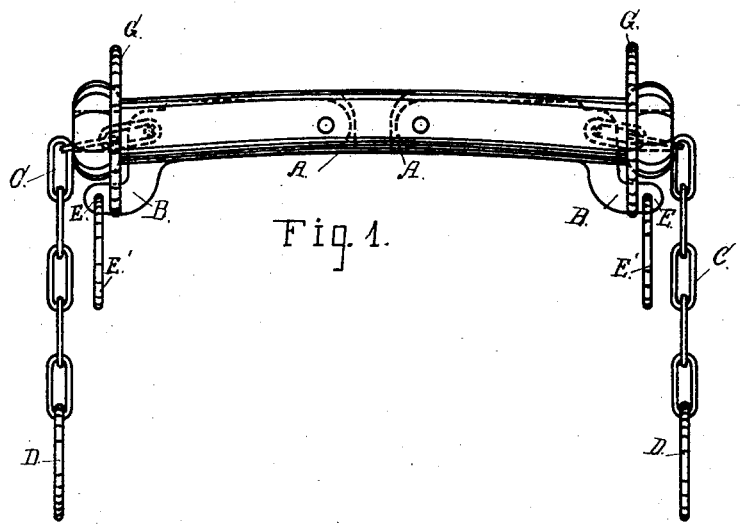
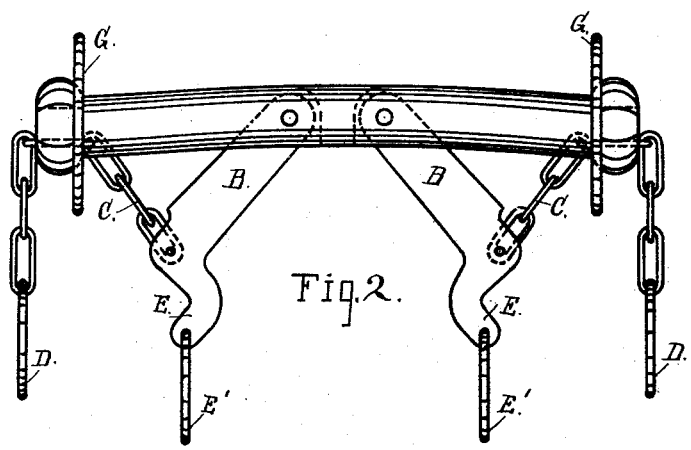
Witnesses:
Inventor:

UNITED STATES PATENT OFFICE.

HIRAM M. CLEMONS, OF VIRGINIA CITY, NEVADA.

BRIDLE-BIT.

SPECIFICATION forming part of Letters Patent No. 327,139, dated September 29, 1885.

Application filed May 18, 1885. (No model.)

*To all whom it may concern:*

Be it known that I, HIRAM M. CLEMONS, a citizen of the United States, residing at Virginia City, in the county of Storey and State of Nevada, have invented a new and useful Bridle-Bit, of which the following is a specification.

This invention consists in making the check-pieces so that they will shut into the bit and be drawn out by the reins or check-strap, as occasion requires, and in forming said check-pieces with angular arms and rings; and it further consists in certain peculiarities of construction, as hereinafter set forth.

In the accompanying drawings, forming a part of this specification, Figure 1 is a plan of my improved bridle-bit with check-pieces closed within the bit. Fig. 2 is also a plan with the check-pieces drawn outwardly from the bit.

The bit-iron proper is provided with two slots, A, extending from near the center of the bit outwardly to each end thereof. These slots pass through the bit-iron, and annular holes or openings are made in both ends of the bit.

The check-pieces B are flat angle-irons, which are pivoted at their inner ends within the slots. To each corner or angle of the check-pieces is pivoted a chain, C, which passes through the cylindrical openings in the ends of the bit, and the ends of these chains are provided with a ring, D.

The outer ends of the check-pieces are made angular, and to the arms E are connected a ring, E', and when the chains C are hauled taut the check-pieces are shut up within the bit-iron, as shown at Fig. 1.

The head-stall rings G are rigidly connected to the bit, and are always in a vertical position in line with the bit-iron.

In operation, if the animal is gentle, the driving reins are connected to the rings D and the check-rein in the rings E'. On the contrary, if the animal be vicious, the driving-reins are placed in the rings E' at the end of the check-pieces and the check-rein in the rings D, so that if the animal attempts to run away, by drawing upon the reins the check-pieces will be drawn from the slots into the mouth of the animal, in which position the weakest driver can manage him.

When the check-pieces are in position in driving with loose reins, the animal will generally throw the head forward, and this action, through the medium of the check-rein, will pull or carry the check-pieces back into the slots in the bit-iron, and a smooth bit is then had.

In arranging the bit for a riding-bridle or hitching the animal with the reins in the rings D, a halter or strap is connected to one of the rings E', and the end of the halter is passed through the other or opposite ring E', and by drawing upon the halter a pressure is brought to bear upon the under jaw of the animal that will soon cause him to become quiet.

I am aware that bridle-bits have heretofore been constructed having check-pieces pivoted to the bit-iron and adapted to be drawn backward and forward. This, therefore, I do not broadly claim as new; but What I do claim as new, and desire to secure by Letters Patent, is—

A bridle-bit consisting of a slotted bit-iron having annular openings at the ends, to the center of which bit-iron are pivoted check pieces B B, provided with angular arms E E, carrying rings E' E', said check-pieces being adapted to operate in the slots of the bit-iron by being drawn from or shut within them by means of link or chain connections C, passing through the cylindrical openings in the ends of the bit, substantially in the manner and for the purpose herein set forth and specified.

In testimony that I claim the foregoing I have hereunto set my hand and seal.

HIRAM M. CLEMONS. [L. S.]

Witnesses:
W. ENGLISH,
A. SPENCER.